(12) United States Patent
Turcanu (10) Patent No.: US 11,031,899 B1
(45) Date of Patent: Jun. 8, 2021

(54) METHOD FOR OPERATING AN ELECTRONICALLY COMMUTATED SYNCHRONOUS MACHINE, AND ACTUATION CIRCUIT

(71) Applicant: Continental Teves AG & Co. oHG, Frankfurt am Main (DE)

(72) Inventor: Alexandru Turcanu, Miroslava (RO)

(73) Assignee: Continental Teves AG & Co. oHG

( * ) Notice: Subject to any disclaimer, the term of this patent is extended or adjusted under 35 U.S.C. 154(b) by 284 days.

(21) Appl. No.: 16/344,957

(22) PCT Filed: Nov. 7, 2017

(86) PCT No.: PCT/EP2017/078414
§ 371 (c)(1),
(2) Date: Apr. 25, 2019

(87) PCT Pub. No.: WO2018/087063
PCT Pub. Date: May 17, 2018

(30) Foreign Application Priority Data

Nov. 11, 2016 (EP) ...................................... 16198509
Jun. 30, 2017 (DE) ...................... 10 2017 211 196.8

(51) Int. Cl.
*H02P 27/08* (2006.01)
(52) U.S. Cl.
CPC .................................. *H02P 27/085* (2013.01)
(58) Field of Classification Search
CPC .................................................... H02P 27/085
(Continued)

(56) References Cited

U.S. PATENT DOCUMENTS 7,308,192 B2   12/2007   Williams et al.
8,643,319 B2 *  2/2014   Celik ........................ H02P 6/28
                                                          318/400.14
(Continued)

FOREIGN PATENT DOCUMENTS

DE      102011003897 A1   8/2012
DE      102013221433 A1   4/2015
WO          03105329 A1  12/2003

OTHER PUBLICATIONS

Korean Notice of Grounds for Rejection for Korean Application No. 10-2019-7013409, dated Sep. 11, 2020, with translation, 15 pages.

(Continued)

*Primary Examiner* — David Luo
(74) *Attorney, Agent, or Firm* — RatnerPrestia (57) ABSTRACT

A method for operating an electronically commutated synchronous machine with several phases, wherein an actuation circuit operates the synchronous machine, the actuation circuit having at least two switches for each phase and a degree of actuation for each phase being periodically ascertained by the actuation circuit, wherein the switch-on period, during which a supply voltage is applied to the respective phase by way of the associated switch, is determined for ascertaining the degree of actuation, wherein the following steps are carried out: measuring current by a single measurement resistor in at least two measurement windows and shifting one or more of the switch-on periods of the different phases relative to one another as soon as the difference between switch-on instants of at least two phases falls below a minimum period or the difference between the switch-on periods of at least two phases falls below twice the minimum period.

10 Claims, 5 Drawing Sheets

(58) Field of Classification Search
USPC .............................. 318/400.26, 400.01, 700
See application file for complete search history.

(56) References Cited

U.S. PATENT DOCUMENTS 9,716,462 B2   7/2017  Stauder et al.
2015/0365026 A1  12/2015  Schock et al.

OTHER PUBLICATIONS

German Search Report for German Application No. 10 2017 211 196.8, dated Mar. 2, 2018, with partial translation—9 pages.
International Search Report and Written Opinion for International Application No. PCT/EP2017/078414, dated Jan. 17, 2018—9 pages.

* cited by examiner

METHOD FOR OPERATING AN ELECTRONICALLY COMMUTATED SYNCHRONOUS MACHINE, AND ACTUATION CIRCUIT

CROSS REFERENCE TO RELATED APPLICATIONS

This application is the U.S. National Phase Application of PCT International Application No. PCT/EP2017/078414, filed Nov. 7, 2017, which claims priority to German Patent Application No. 10 2017 211 196.8, filed Jun. 30, 2017, and European Patent Application No. 16198509 filed Nov. 11, 2016 the contents of such applications being incorporated by reference herein.

FIELD OF THE INVENTION

The invention relates to a method for operating an electronically commutated synchronous machine, and also to an actuation circuit.

BACKGROUND OF THE INVENTION

Electronically commutated synchronous machines with permanent excitation, also known as brushless motors, have a stator with at least two, in particular three, phase windings and a rotor with at least one pole pair which is arranged perpendicularly to the rotation axis and is formed by one or more permanent magnets which are arranged in or on the rotor. A brushless motor is supplied with current by way of an actuation circuit in which each phase winding is assigned an upper and a lower switch (half-bridge), which switches can apply an upper or a lower supply voltage to said phase winding. If one or more phase windings are energized, the rotor aligns itself in the magnetic field that is produced. For the purpose of targeted actuation, it is necessary to ascertain the rotor position, this being performed, for example, by means of a resolver or rotary encoder.

Expediently, it is possible to perform closed-loop control of the currents by means of the phase windings in a coordinate system which is fixed to the rotor, wherein a d-axis in the direction of the rotor magnetic field and a q-axis which is at 90° (electrical angle, linked to the mechanical angle by way of the pole pair number) in relation to said d-axis are considered. A current which flows in the q-axis direction determines (in a motor without reluctance torque) the torque which is output and is therefore designated the torque-forming current (iq). In order to achieve high rotation speeds, it is possible to perform a field-weakening closed-loop control operation in which a current which flows in the d-axis direction is also prespecified. The coordinate system which is fixed to the rotor rotates in relation to the stator, therefore the phase currents or corresponding phase voltages which are to be applied are ascertained by way of a suitable transformation with reference to the rotor position. It is also possible to prespecify phase voltages by way of alternative methods such as, for example, an open-loop control operation with the aid of values which are stored in a table. In accordance with the ascertained phase voltages, degrees of actuation and also time periods which correspond to said degrees of actuation and during which the respective phase windings are connected to the upper or the lower supply voltage by the actuation circuit are periodically ascertained in a pulse width modulation (PWM), such as in particular a space vector modulation.

Switching effects in the inverter of the actuation circuit are a leading source of line-bound interference phenomena which can result in malfunctions in electronic circuits by way of the on-board electrical system. Both interference phenomena in the range of the switching frequency as well as their harmonic waves in the case of multiples of the switching frequency are generated by switching the power semiconductors which actuate the phase windings. In terms of the electromagnetic compatibility (EMC), it is important specifically in the case of electric motors as consumers with a relatively high electrical power to minimize the output of interference pulses. For this reason, a centered, polyphase PWM is frequently carried out, this producing a broader frequency spectrum in comparison to a flank-centered PWM since the input and output switching flanks in the case of a rotating motor are continuously changed with respect to the fixed time pattern which is specified by the PWM base frequency. The associated frequency spectrum of the interference pulses which are output is consequently smoothed and the averaged amplitude values of the switching frequency and harmonic waves are therefore smaller.

Measurement resistors (so-called shunts, low impedance) are used for measuring the currents of the individual phases. In this case, phase currents are ascertained in sequential order. It is sufficient to measure only two phases in the case of, for example, a three-phase arrangement. The current of the other phase can be calculated with the aid of laws (Kirchhoff's laws).

In order to save costs, it is possible to use only one single shunt. However, the prior art exhibits the disadvantage that, for the measurement, it is not possible by means of a single shunt to provide centering of the switch-on periods of the individual phases with a fixed measurement point or measurement window or shifted switch-on periods with a dynamic measurement point or measurement window. Specifically, if, for example, centering of the switch-on periods is provided and two of the switch-on periods have the same values, it is not possible to measure the currents of the phases. In addition, the measurement windows would have to change as soon as the duty cycle changes, but this is not readily possible in most microcontrollers.

For this reason, the duty cycles according to the prior art are shifted (see, for example, DE 10 2011 003 897 A1, incorporated by reference herein). For this purpose, for example, currents are fed into the motor, but said currents cause relatively high torque ripples and relatively poor NVH (noise vibration harshness) behavior.

For the purpose of selecting a measurement instant or measurement window, it is necessary to wait for a minimum time until the measurement takes place in order to obtain correct values. The minimum time depends, for example, on the PWM frequency, the dead time, the settling time of the measurement amplifier circuit and the sampling time of the analog/digital converter. In this case, the dead time is the waiting time between changeover of the two half-bridges, so that a short circuit is not produced. However, when the duty cycle is shifted, the measurement instants are likewise shifted. This has the effect that a measurement is not possible in the full PWM period.

In another solution according to the prior art, fixed measurement instants are provided, but the duty cycles are edge-aligned here. This likewise causes more torque ripple. In order to achieve an improvement by way of reducing the torque ripples, the fed-in currents for shifting the phases would have to be removed. This would mean that the PWM phases would be arranged in a central manner. However, currents cannot be measured when there is a central arrangement and two PWMs have the same values.

SUMMARY OF THE INVENTION

The aspect of the invention aims to improve the measurement of currents across polyphase synchronous machines.

An aspect of the invention provides a method for operating an electronically commutated synchronous machine with several phases, in particular three phases, wherein an actuation circuit is provided for operating the synchronous machine, said actuation circuit having at least two switches for each phase and a degree of actuation for each phase being periodically ascertained by means of said actuation circuit, wherein the switch-on period, during which a supply voltage is applied to the respective phase by way of the associated switch, is determined for ascertaining the degree of actuation, wherein the following steps are carried out:
measuring current by means of a single measurement resistor in at least two measurement windows. In addition, the following further steps are carried out:
shifting one or more of the switch-on periods of the different phases relative to one another as soon as the difference between switch-on instants of at least two phases falls below a minimum period or the difference between the switch-on periods of at least two phases falls below twice the minimum period.

Shifting of the switch-on periods is intended to be understood to mean that the start instant of the switch-on period (switch-on instant) is shifted, wherein the duration of the switch-on operation remains the same. Therefore, the duty cycle remains identical while the start instant of the duty cycle is shifted.

In the context of an aspect of the invention, the switch-on instant is intended to be understood to mean the instant at which the switch-on period begins. The switch-on period corresponds to the duty cycle, that is to say the time at which a "High" or a "1" is set. The switch-on instant therefore corresponds to the flank rise when switching from 0 to 1. The start instants of the switch-on durations (flank rise, switch-on instant) are preferably aligned in such a way that they are situated outside the period in which measurement is intended to be performed.

In this case, the minimum period is preferably the period which is required until the signal has stabilized. In this case, the minimum period is, for example, formed from a dead time, a settling time and/or a sampling time of an analog/digital converter. This time is required at a minimum after changeover in the duty cycle (for example from high to low or vice versa) until a measurement can be carried out. When the difference between two switch-on instants is lower than this minimum period, a measurement cannot be carried out or this measurement would contain faults. Therefore, the duty cycle, that is to say the switch-on period or the instant of the switch-on period, is shifted when establishing a difference of this kind. The switch-on period, that is to say the length of the state switched to "1", remains the same in this case. This results in a difference between the two switch-on instants which is greater than the minimum period, and therefore a measurement can now be carried out. As an alternative, the difference between the switch-on periods is determined. When this difference is lower than twice the minimum period, the shifting is carried out.

The method according to an aspect of the invention provides the advantage that torque ripples can be reduced. This is achieved in that fixed measurement points are obtained and at the same time a central arrangement of the switch-on periods is provided as soon as enough voltage is applied.

When it is established that the difference between the switch-on instants is greater than the minimum period or the difference between the switch-on periods is greater than twice the minimum period, shifting is not implemented. The switch-on periods are then preferably arranged in a central manner and in particular sorted in accordance with their duty cycles. In this case, the middle phase or second phase can assume a fixed position. The switch-on period of this second phase can begin, for example, the time of a minimum period before the beginning of a new period. In other words, the "high time" of the second phase then begins a minimum period before the beginning of a new period. The switch-on period of the first phase can begin, for example, a minimum period before the switch-on period of the second phase when the difference between the switch-on period of the first and second phase is less than two minimum periods. However, if the difference is greater than two minimum periods, the switch-on periods are arranged in a centered manner. The switch-on period of the third phase can begin, for example, with the beginning of a new period when the switch-on period of the third phase is two minimum periods smaller than that of the middle phase. However, said third phase could be in centered arrangement with the middle phase if the switch-on period of the third phase is greater than that of the middle phase.

Therefore, either a check can be made as to whether the difference between two switch-on instants is greater than the minimum period or a check can be made as to whether the difference between the switch-on periods is greater than two minimum periods. If this is not the case, the shifting takes place.

In other words, shifting always takes place when the difference between the phases is not large enough for a measurement, that is to say for example is smaller than two minimum periods when comparing the length of the switch-on periods. However, as soon as the difference is large enough for a measurement, for example is greater than two minimum periods, the switch-on periods are arranged in a centered manner. The difference between the switch-on periods is, in particular, always high when a high voltage is also applied and therefore high speeds or torques are present. Identical faults in the current can result in relatively large torque ripples at high voltages, this causing a relatively poor NVH (Noise Vibration Harshness) behavior. An aspect of the invention has the advantage that a centered arrangement of the switch-on periods (duty cycles) is provided for a maximum time, and therefore the torque ripple is reduced.

Specifically, an example of this can be as follows when there are three phases with a duty cycle U, V and W: When the difference between U and V is greater than twice the minimum period (minimum period*2), the phases are arranged in a central manner. When the difference between V and W is greater than twice the minimum period, these two phases are likewise arranged in a central manner. When the difference between two phases is smaller than twice the minimum period, a start is then made on shifting the phases. If a low voltage is required, the difference between the duty cycles of the two phases will not be greater than twice the minimum period, and therefore the phases will still be shifted. However, when a high voltage is requested, a central arrangement will be present for most of the time.

In other words, it can be assumed that the phases are edge-aligned when the difference between the switch-on times is smaller than twice the minimum period. Starting from the edges (flank rises), extending of the switch-on time takes place only in such a way that the falling flank is moved further away from the rising flank. Similarly, shortening of the switch-on time takes place in such a way that the falling flank is moved further in the direction of the rising flank. The left-hand-side flanks (rising flanks) remain fixed in their position and are moved in relation to one another in each case by the minimum period between the phases. This remains the case until the difference between the switch-on times is greater than twice the minimum time. The flanks then change on both sides in the further course in such a way that the switch-on times are ultimately centered. The phases are then slowly shifted in the direction of central alignment when the difference between the switch-on times is large enough (relatively high voltage).

The phases are shifted for a time period which is required in order to carry out a measurement of the currents. The phases are then arranged in a central manner again. The fixed measurement points are preferably provided at the locations of the restart of a period and also at the restart minus the minimum period.

Even when two phases are intended to have the same switch-on period, it is possible to ensure in this way that a measurement can take place since the start instant of one of the switch-on periods is shifted. In addition, the third phase remains arranged in a centered manner with one of the phases in spite of this.

In an alternative or additional improvement of the measurement, the following steps are carried out in the method:
 increasing the switch-on periods for all phases when the switch-on period of the phase is smaller than a minimum period or
 reducing the switch-on period for all phases when the switch-on period of the phase is greater than the period minus the minimum period.

This solution can be used as an alternative or in addition to the abovementioned solution. The switch-on periods of the individual phases are examined for this purpose. When it is ascertained that the switch-on period is smaller than the minimum period, the switch-on period is increased for all phases, so that it is greater than the minimum period. When it is ascertained that the switch-on period is greater than one period minus the minimum period, the switch-on period is reduced for all phases.

A reduction of the switch-on period (of the duty cycle) is therefore carried out when the first and the middle phase have almost the same value and are very large. If, in this case, specifically the middle phase had been shifted by the minimum period, the duty cycle or the switch-on period would be greater than the PWM period, and therefore a measurement would no longer be possible.

The middle phase has to be between the minimum period and 100% minus the minimum period, so that a measurement can be carried out. This restricts the possible duty cycle. This disadvantage can be resolved and an improved method for measuring currents can be provided by the solution according to an aspect of the invention.

In a preferred embodiment, increasing or reducing the switch-on period is carried out by means of the modulation of a zero vector. The zero vector designates the position of the switches when they all output either a zero or a one and therefore no voltage is applied. In this case, all three phases are short-circuited and no voltage can be measured between the phases. The zero vector therefore designates two of eight switching states of the half-bridges. The zero vectors or the zero voltage space vectors are required for selecting the magnitude of the voltage space vector and are therefore very important for the commutation of a three-phase machine.

In a conventional space vector modulation, the zero vector is the third harmonic, the frequency of which is three times as high as the frequency of a phase and the amplitude of which is a third of the amplitude of a phase. According to an aspect of the invention, this zero vector is modulated, specifically in such a way that measurements cover the entire current range when only one measurement resistor is used. In this context, the modulation of the zero vector means that the zero vector is changed in such a way that the desired effect—specifically of expanding the measurement region—occurs.

Modulation of the zero vectors means it is possible to change the switch-on periods. Therefore, the advantageous effect of the measurement region being expanded is achieved overall. For pulse width modulations (PWM) which are generated by means of space vectors (space vector modulation), it is then possible, for example, to measure currents for PWMs between zero and 100 percent when the minimum period is from zero to six percent of the PWM period.

Usually, a PWM measurement is possible when the PWM is 100% in one phase since, in this case, the other phases are low: one phase is at 0% PWM and the other phase is close to 50% PWM. However, a measurement is not possible when the middle phase has a value of 100% minimum period. This occurs in the case of the range of the first and of the middle phase having virtually the same value.

In a preferred development, shifting of the switch-on periods or increasing or reducing the switch-on periods is performed only at a maximum of two of three phases. In particular, one of the phases, preferably the middle phase, is fixed and is not changed.

In addition, an aspect of the invention relates to an actuation circuit which has means for carrying out said method.

BRIEF DESCRIPTION OF THE DRAWINGS

Exemplary embodiments of aspects of the invention will be explained below on the basis of drawings, in which.

DETAILED DESCRIPTION OF THE PREFERRED EMBODIMENTS

FIGS. 1A-1D show an actuation circuit 1 in various switching states with only one measurement resistor 3.

Switches 5 of the actuation circuit 1 can be either open or closed. A lower switch 5 and an upper switch 5 produce a half-bridge in each case. In this case, current flows in the closed state. The current is supplied to an electronically commutated synchronous machine 7.

Figure 1A:
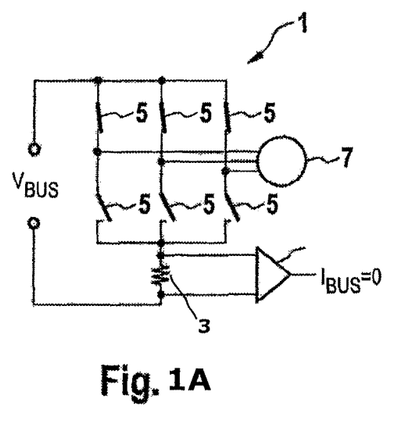
FIGS. 1A-1D: show an actuation circuit with only one measurement resistor in various switching states.
Figure 1B:
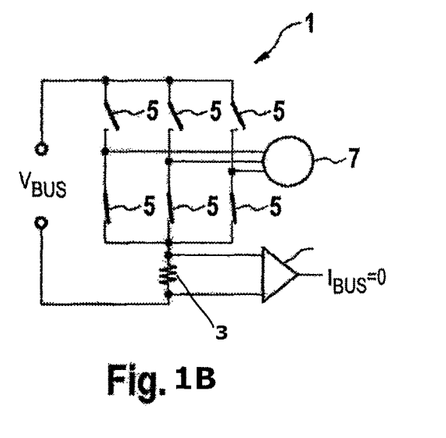

In FIG. 1A, all lower switches 5 are open while all upper switches 5 are closed. Therefore, all phases are short-circuited and current is not measured across the measurement resistor 3. A zero vector can be produced by this switching state. The same applies to FIG. 1B in which the upper switches 5 are open and the lower switches 5 are closed.

Figure 1C:
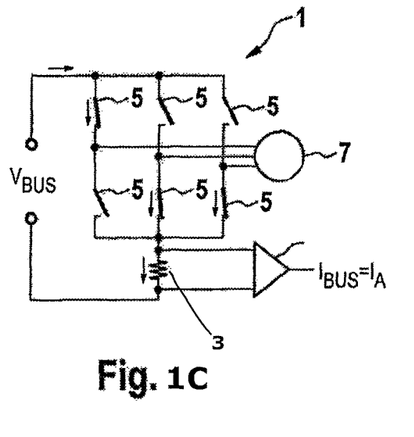
Figure 1D:
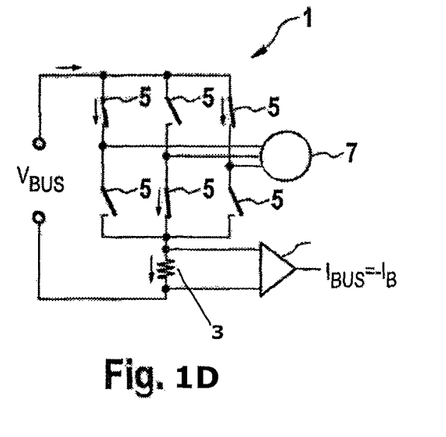

In contrast, FIGS. 1C and 1D do not shown the representation of zero vectors. In FIG. 1C, an upper switch 5 and two lower switches 5 are closed. Therefore, a current is measured across the measurement resistor 3. One of the six active voltage space vectors is represented by this switching position. The same applies to FIG. 1D in which two upper switches 5 and one lower switch 5 are closed. Another of the six active voltage space vectors is produced here.

Figure 2:
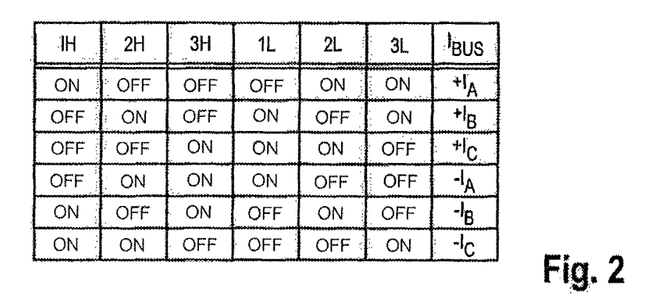
FIG. 2: shows a truth table for the switching states with associated values across the measurement resistor.

A truth table in FIG. 2 shows all possible configurations of switching states, where "H" ("High") designates the upper switches and "L" ("Low") designates the lower switches. The identifiers 1, 2 and 3 represent the various phases. Therefore, each phase is assigned an "H" and an "L" for the two switches. The measured current across the measurement resistor 3 is then indicated in the column on the far right.

Figure 3:
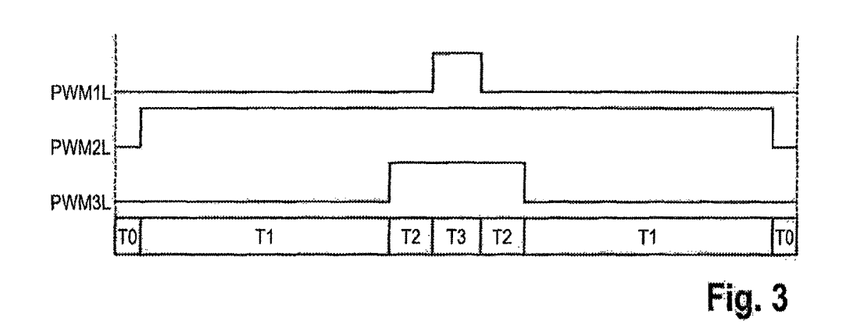
FIG. 3: shows an exemplary illustration with respect to measurement windows.

FIG. 3 illustrates a period with a duty cycle for the lower switches (L). The various phases 1, 2 and 3 are plotted from top to bottom. Measurement windows are identified at the bottom edge of the figure. Measurement cannot take place or only measurement with major errors can take place during T0 and T3. All switch-on periods are simultaneously "on" in T3. However, at least one phase has to be "off", so that meaningful measurement can be carried out. T0 is likewise not intended to be used for a measurement since a minimum period, during which the signal is stabilized, has not yet elapsed here. However, a measurement can take place at measurement instants T1 and T2 since at least one of the phases is "off" in each case here.

Figure 4:
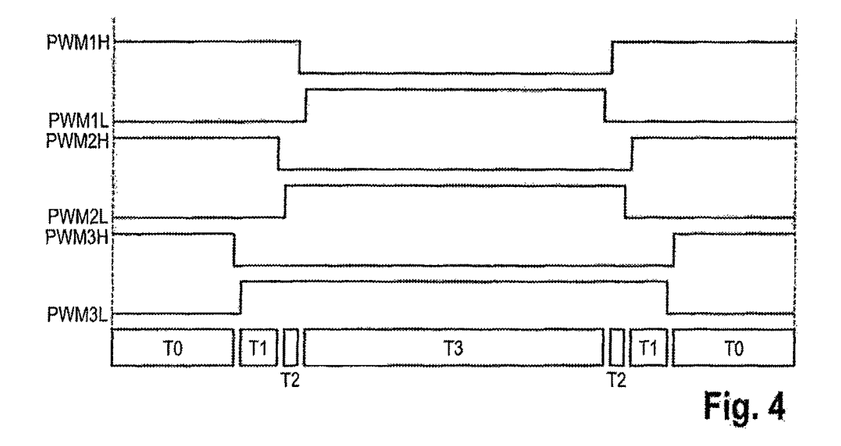
FIG. 4: shows an exemplary illustration at dead times.

FIG. 4 shows an illustration at dead times which have to be taken into account during measurements.

Figure 5:
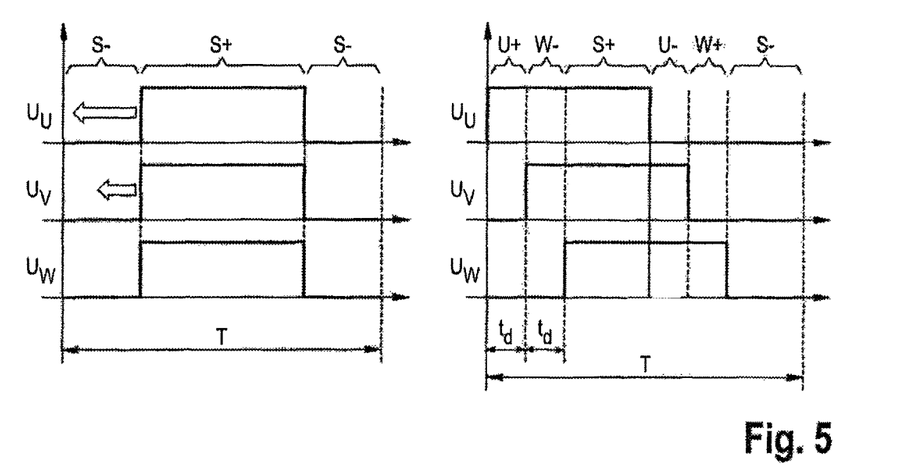
FIG. 5: shows an exemplary shifting of switch-on periods of several phases according to the prior art.

FIG. 5 shows an exemplary shifting of switch-on periods of several phases according to the prior art, wherein a space vector modulation is applied. The diagram on the left-hand side shows three phases without shifting. The diagram on the right-hand side in FIG. 5 shows shifting of the switch-on periods of the first and the second phase by the minimum period td (second phase) and, respectively, td*2 (first phase) in relation to the switch-on period of the third phase.

Figure 6:
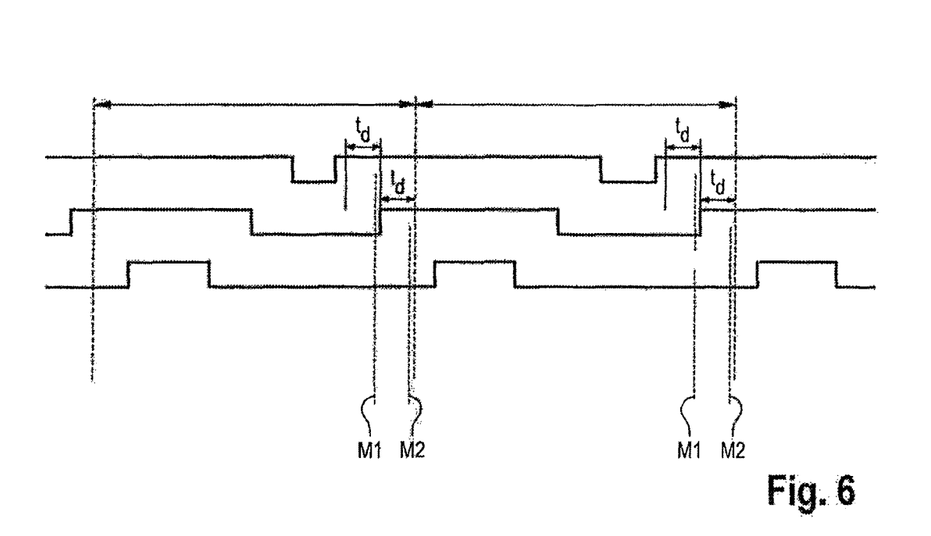
FIG. 6: shows an illustration according to an aspect of the invention of switch-on periods of several phases and measurement instants.

FIG. 6 shows an illustration according to an aspect of the invention of switch-on periods of several phases and measurement instants, wherein there is no shifting since the difference between the switch-on periods is greater than twice the minimum period (double the minimum period). In this case, the phases are all centrally aligned. The dashed line shows the restart of a period. td designates the minimum period. The measurement instants are identified by M1 and M2.

Figure 7:
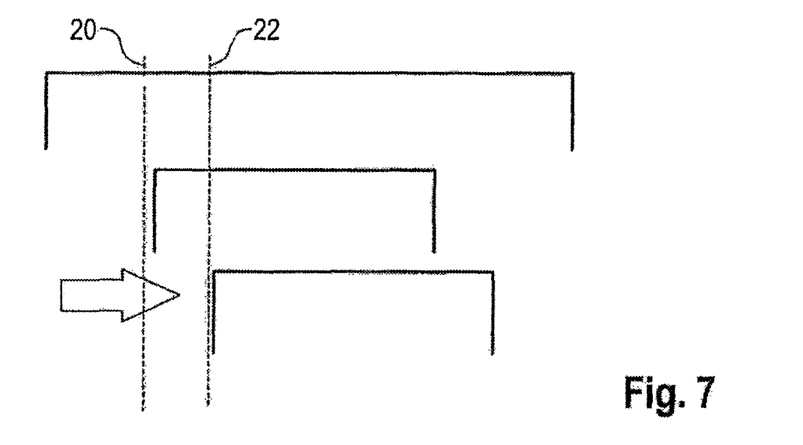
FIG. 7: shows an illustration according to an aspect of the invention of switch-on periods of several phases and measurement instants with shifting.

However, when the difference between the switch-on periods of the phases is smaller than twice the minimum period, the switch-on periods of the phases are shifted, as in FIG. 7. Said figure illustrates, by way of example, shifting of the third (lowermost) phase. As a result, central alignment with the other two phases is no longer provided, but measurement of the currents is possible as a result. 20 designates a first measurement instant (measurement window), while 22 identifies a second measurement instant (measurement window). At the same time, the beginning of a new period occurs at this second measurement instant 22.

Figure 8:
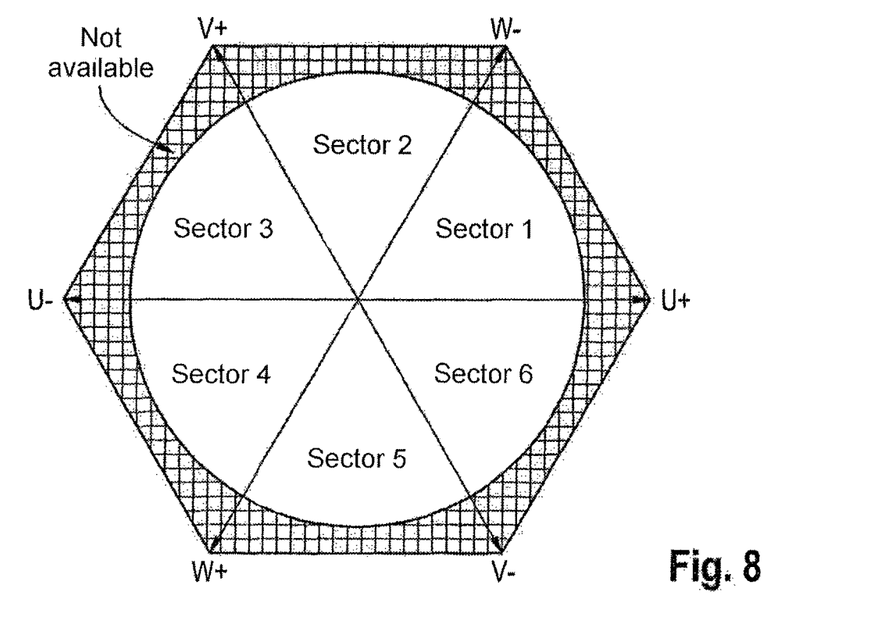
FIG. 8: shows an exemplary illustration of the actuating region of a converter.

FIG. 8 shows, by way of example, an actuation region of a converter in the form of a regular hexagon comprising the six sectors which can be represented by the six active vectors in accordance with space vectors. However, according to the prior art, measurement is possible only within a circular trajectory within this hexagon. This region is expanded according to an aspect of the invention.

Figure 9:
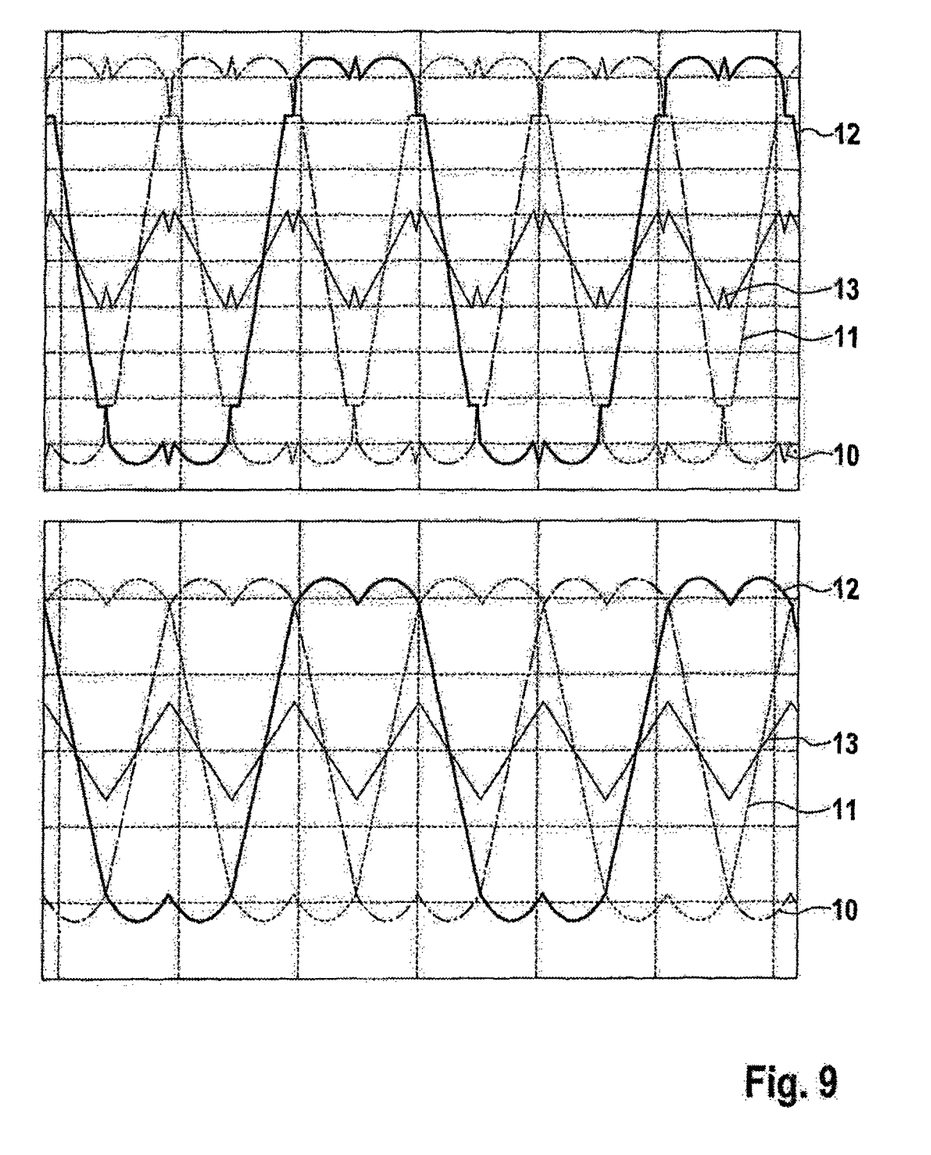
FIG. 9: shows an exemplary illustration of the three phases with a zero vector which is modulated according to an aspect of the invention.

FIG. 9 shows an exemplary illustration of the three phases according to the prior art (at the bottom, normal SVM modulation) and with a zero vector which is modulated according to an aspect of the invention (at the top). The curves 10, 11 and 12 each show a phase, while the curve 13 shows the (modulated) zero vector. Here, the third harmonic is added to the phases and gives them their form. As a result, the sum of the zero vector voltages of the phases is no longer zero.

The invention claimed is:

1. A method for operating an electronically commutated synchronous machine with several phases, wherein an actuation circuit is provided for operating the synchronous machine, said actuation circuit having at least two switches for each phase and a degree of actuation for each phase being periodically ascertained by said actuation circuit, wherein a switch-on period, during which a supply voltage is applied to the respective phase by way of the associated switch, is determined for ascertaining the degree of actuation, the method comprising:
    measuring current by a single measurement resistor in at least two measurement windows, and
    shifting one or more of the switch-on periods of the different phases relative to one another as soon as a difference between switch-on instants of at least two phases falls below a minimum period or a difference between the switch-on periods of at least two phases falls below twice the minimum period.

2. The method as claimed in claim 1, wherein the minimum period is determined at least from a dead time, a settling time and/or a sampling time.

3. The method as claimed in claim 2, further comprising defining the measurement windows for a fixed temporal position in each case.

4. The method as claimed in one of the preceding claims, claim 1, further comprising the following step is carried out: defining the measurement windows for a fixed temporal position in each case.

5. The method as claimed in claim 4, wherein increasing and/or reducing the switch-on period is carried out by a modulation of a zero vector.

6. The method as claimed in claim 1, further comprising positioning the switch-on periods of the phases in such a way that they are aligned in a centered manner in relation to one another when the difference between the switch-on instants exceeds a minimum period or the difference between the switch-on periods exceeds twice the minimum period.

7. The method as claimed in claim 1, wherein the switch-on period is shifted only at at most two of the phases, whereas the other phase is unchanged.

8. An actuation circuit for an electronically commutated synchronous machine, characterized in that the synchronous machine comprising means for carrying out the method as claimed in claim 1.

9. A method for operating an electronically commutated synchronous machine with three phases, wherein an actuation circuit is provided for operating the synchronous machine, said actuation circuit having at least two switches for each phase,
the method comprising:
periodically ascertaining a degree of actuation for each phase by a single measurement resistor, wherein a switch-on period, during which a supply voltage is applied to the respective phase by way of the associated switch, is determined for ascertaining the degree of actuation, and
increasing the switch-on periods for all phases when the switch-on period of a predetermined phase is smaller than a minimum period or
reducing the switch-on period for all phases when the switch-on period of a predetermined phase is greater than one period minus the minimum period.

10. An actuation circuit for an electronically commutated synchronous machine, the synchronous machine comprising means for carrying out the method as claimed in either of claim 9.

\* \* \* \* \*